(12) United States Patent
Jin et al.

(10) Patent No.: US 8,094,141 B2
(45) Date of Patent: Jan. 10, 2012

(54) PORTABLE ELECTRONIC DEVICE

(75) Inventors: Lei Jin, Shenzhen (CN); Xiong Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 438 days.

(21) Appl. No.: 12/503,865

(22) Filed: Jul. 16, 2009

(65) Prior Publication Data

US 2010/0259509 A1   Oct. 14, 2010

(30) Foreign Application Priority Data

Apr. 8, 2009  (CN) .......................... 2009 1 0301419

(51) Int. Cl.
*G09G 5/00*   (2006.01)

(52) U.S. Cl. ........ 345/184; 345/156; 345/157; 345/160; 324/207.11; 324/207.13; 455/575.1; 455/575.4; 455/90.3

(58) Field of Classification Search .................. 345/184, 345/156–174, 175; 324/207.11, 207.13, 324/403, 415, 76.11, 73.1, 600, 500; 455/575.1, 455/575.4, 90.3; 340/146.2, 1.1, 286.01, 340/407.2, 815.4; 361/679.01, 679.02, 679.09, 679.1, 679.11, 679.18, 679.3, 679.56; 335/205, 209

See application file for complete search history.

(56) References Cited

U.S. PATENT DOCUMENTS

| | | | | |
|---|---|---|---|---|
| 2002/0093328 | A1* | 7/2002 | Maatta et al. | 324/207.11 |
| 2005/0079898 | A1* | 4/2005 | Park | 455/575.1 |
| 2008/0151510 | A1* | 6/2008 | Cho et al. | 361/727 |
| 2008/0167098 | A1* | 7/2008 | Mizuta et al. | 455/575.4 |
| 2009/0009472 | A1* | 1/2009 | Park | 345/160 |
| 2009/0061947 | A1* | 3/2009 | Park et al. | 455/566 |

* cited by examiner

*Primary Examiner* — Lun-Yi Lao
*Assistant Examiner* — Kelly B Hegarty
(74) *Attorney, Agent, or Firm* — Altis Law Group, Inc.

(57) ABSTRACT

A portable electronic device includes a base segment, a sliding segment, and an input module. The base segment defines more than one indicator. The sliding segment is slidably connected to the base segment and defines a pointer operable to align with an indicator. The input module includes a first magnet, a second magnet, and a sensor. The first magnet is received in the base segment. The second magnet is fixed to the sliding segment to align with the first magnet, and is configured for applying a magnetic force to the first magnet. The sensor is connected to the first magnet to sense the magnetic force and convert the magnetic force into a corresponding electrical signal. The electrical signal is inputted to the electronic device.

7 Claims, 5 Drawing Sheets

PORTABLE ELECTRONIC DEVICE

BACKGROUND

1. Technical Field

The present disclosure relates to portable electronic devices and, particularly, to a portable electronic device having an additional input device.

2. Description of Related Art

Current portable electronic devices such as mobile phones typically employ a keypad for inputting numerals and characters. Generally, the portable electronic devices include a numeric input mode and a character input mode for inputting numbers and characters respectively. However, when a combination of numerals and characters needs to be inputted, the input mode needs to be switched back and forth repeatedly, this is an inconvenience.

Therefore, it is desirable to provide a portable electronic device having an additional input device which can overcome the above-mentioned problems.

DETAILED DESCRIPTION

Embodiments of the disclosure will now be described in detail with reference to the drawings.

Figure 1:
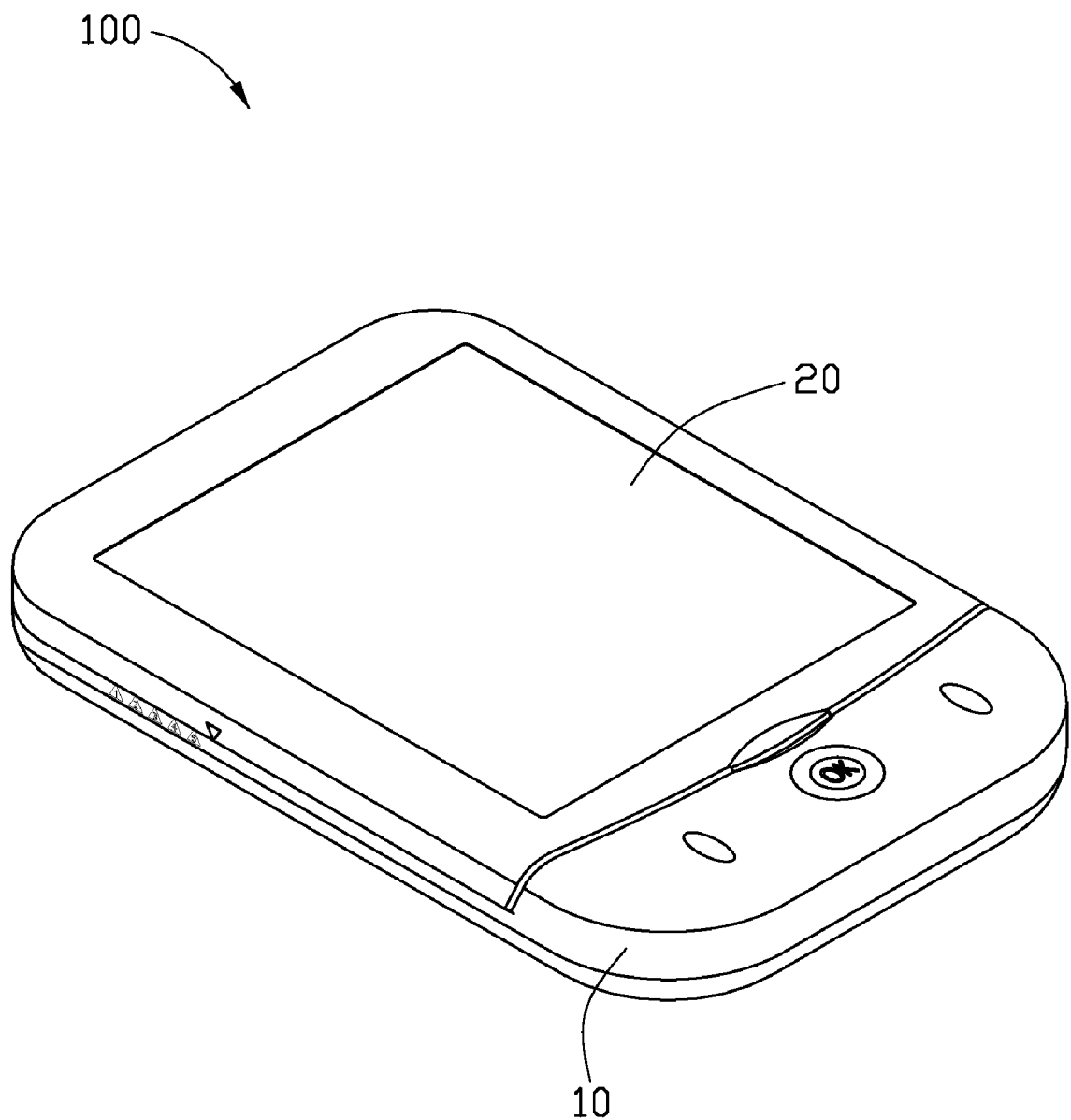
FIG. 1 is an assembled, isometric, schematic view of a portable electronic device, according to an exemplary embodiment.
Figure 2:
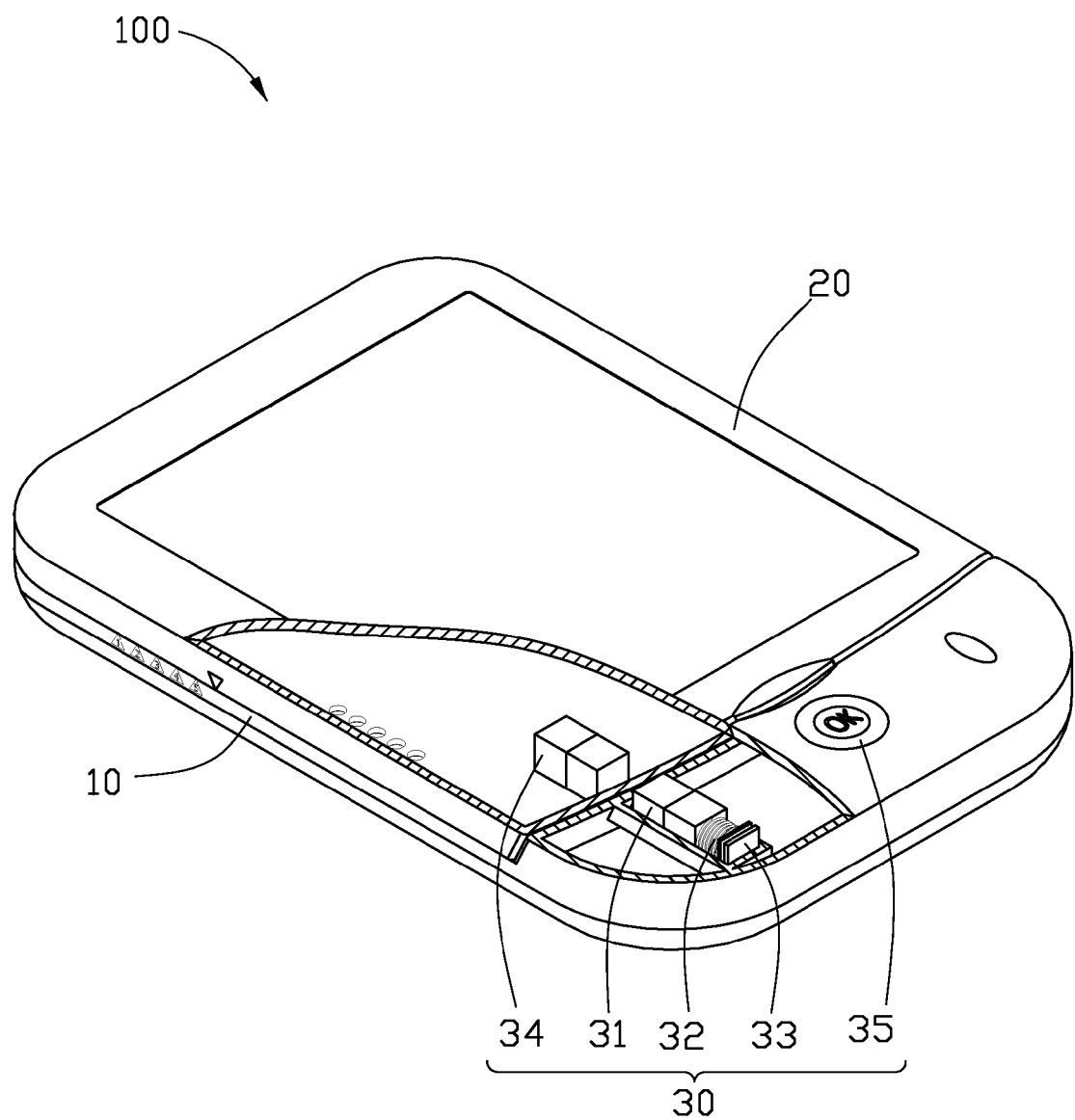
FIG. 2 is a partially sectioned, isometric, schematic view of the portable electronic device of FIG. 1.

Referring to FIGS. 1-2, a portable electronic device 100 includes a base segment 10, a sliding segment 20, and an input module 30. In this embodiment, the portable electronic device 100 is a sliding mobile phone.

Figure 3:
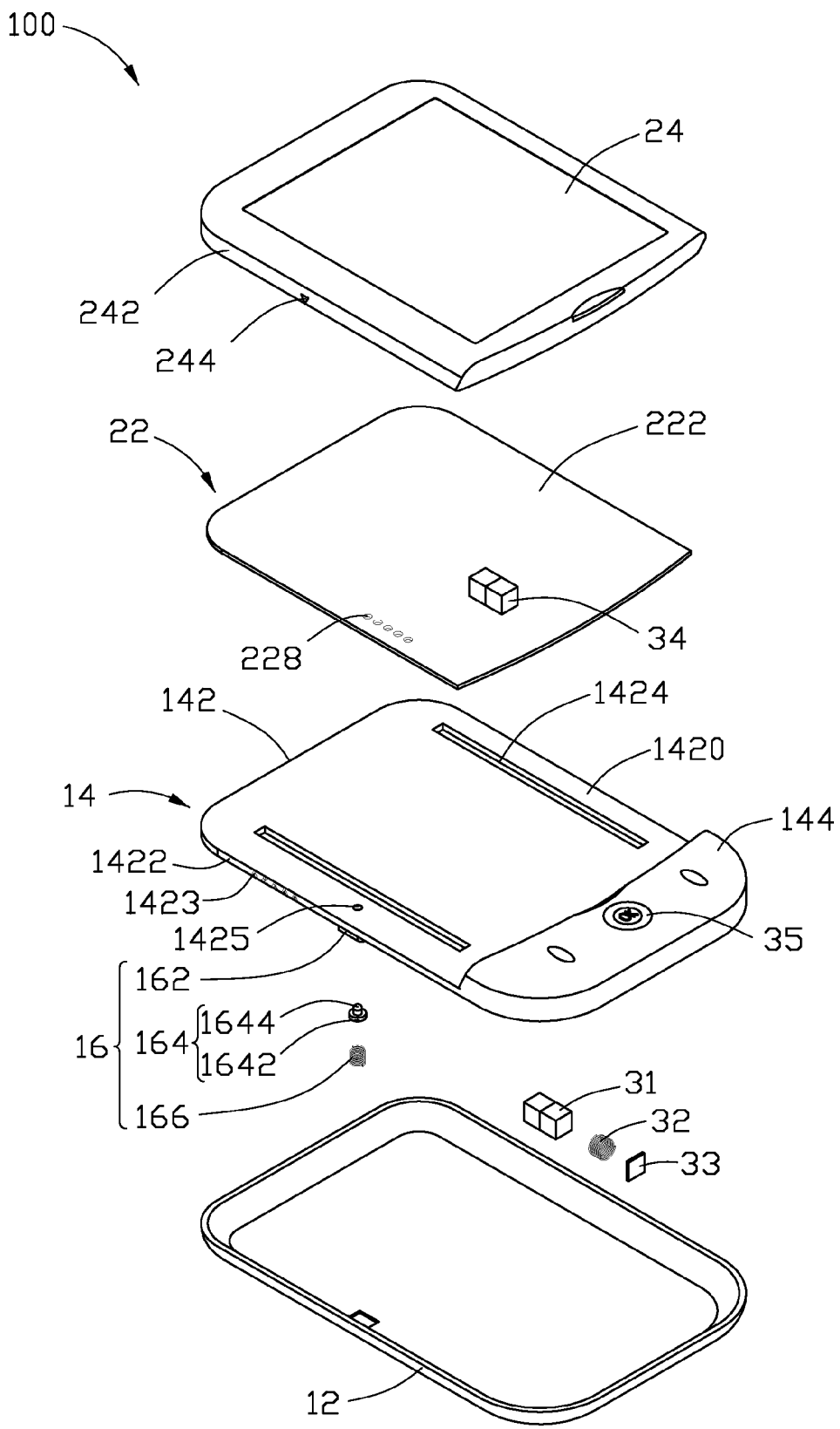
FIG. 3 is an exploded, isometric, schematic view of the portable electronic device of FIG. 1.
Figure 4:
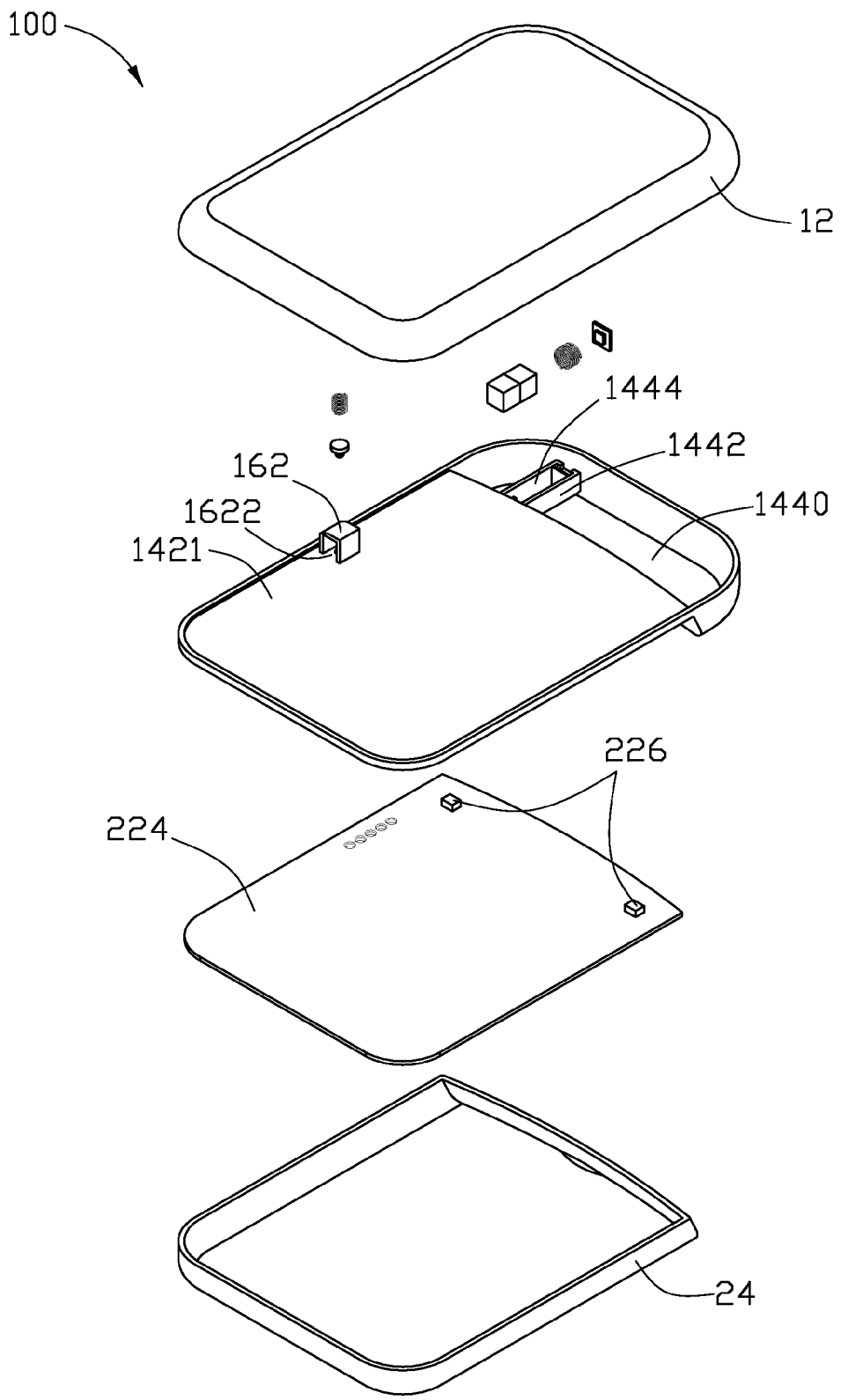
FIG. 4 is an exploded, isometric, schematic view of the portable electronic device of FIG. 1, viewed at anther angle.

Also referring to FIGS. 3-4, the base segment 10 includes a bottom shell 12, a main body 14 with various required components of the base segment 10 installed therein, and a positioning module 16.

The main body 14 includes a substantially rectangular cover plate 142 and a keypad 144. The cover plate 142 includes a first upper surface 1420, a first bottom surface 1421 opposite to the first upper surface 1420, a first side surface 1422 connecting the first upper surface 1420 and the first bottom surface 1421, and five indicators 1423 defined on the first side surface 1422. The cover plate 142 defines two rails 1424 in the first upper surface 1420 substantially along the length of the cover plate 142, and a through hole 1425 through the first upper surface 1420 and the first bottom surface 1421. The keypad 144 is substantially a rectangular hollow block protruding from one end of the first upper surface 1420. In this embodiment, the cover plate 142 and the keypad 144 are integrally formed. The keypad 144 defines a receiving chamber 1440, and includes a receiving frame 1442 received in the receiving chamber 1440. The receiving frame 1442 defines a receiving slot 1444.

The positioning module 16 includes a positioning frame 162, a positioning member 164, and a positioning spring 166. The positioning frame 162 defines a positioning groove 1622. The positioning member 164 includes a circular base plate 1642 and a circular positioning column 1644 extending upwards from the base plate 1642. The distal end of the positioning column 1644 is semi-spherical in shape. The diameter of the base plate 1642 is greater than that of the through hole 1425, while the diameter of the positioning column 1644 is a little smaller than that of the through hole 1425. The length of the positioning column 1644 is a little longer than the depth of the through hole 1425. The natural length of the positioning spring 166 and the thickness of the base plate 1642 are longer than the depth of the positioning groove 1622.

The sliding segment 20 includes a substantially rectangular bottom plate 22 and a sliding body 24 with various required components of the sliding segment 20 installed therein.

The bottom plate 22 includes a second upper surface 222, a second bottom surface 224 opposite to the second upper surface 222, and two sliding blocks 226 mounted on the second bottom surface 224. Each sliding block 226 is generally a rectangular block. The spacing of the two sliding blocks 226 is substantially equal to that of the two rails 1424, and the width of the sliding block 226 is substantially equal to that of the rail 1424. The bottom plate 22 further defines five positioning through holes 228 communicating with the second upper surface 222 and the second bottom surface 224. The positioning through holes 228 are arranged in a straight line, and the pitch of the positioning through holes 228 is substantially equal to that of the indicators 1423. The diameter of the positioning through hole 228 is substantially equal to that of the through hole 1425.

The sliding body 24 is substantially a rectangular concave body. The length and width of the sliding body 24 is substantially equal to that of the bottom plate 22. The sliding body 24 includes a second side surface 242, and defines a pointer 244 on the second side surface 242.

The input module 30 includes a first magnet 31, a connecting spring 32, a sensor 33, a second magnet 34, and a confirming button 35. The first and second magnets 31 are rectangular blocks in shape. The sensor 33 is a pressure sensor. The length of the first magnet 31, the natural length of connecting spring 32, and the thickness of the sensor 33 are smaller than the length of the receiving slot 1444.

In assembly, the positioning frame 162 is disposed on the first bottom surface 1421 and communicates with the through hole 1425. In this embodiment, the positioning frame 162 and the cover plate 142 are integrally formed. The positioning spring 166 is received in the positioning slot 1622. The base plate 1642 is connected to the positioning spring 166, and the distal end of the positioning column 1644 is inserted through the through hole 1425. The positioning spring 166 is compressed because the natural length of the positioning spring 166 and the thickness of the base plate 1642 are greater than the depth of the positioning slot 1622. The first magnet 31, the connecting spring 32 and the sensor 33 are received in the receiving slot 1444. One end of the connecting spring 32 is connected to the first magnet 31, and the other end is connected to the sensor 33. The confirming button 35 is disposed on the keypad 144. In practice, the sensor 33 and the confirming button 35 are further connected to a processing circuitry (not shown) of the portable electronic device 100. Then, the main body 14 is disposed on the bottom shell 12, and the first upper surface 1420 is exposed. The second magnet 34 is fixed (e.g., pasted) on the second upper surface 222 and aligned with the first magnet 31. In this embodiment, the negative polarities of the first and second magnets 31, 34 face each other. The sliding body 24 is disposed on the second upper surface 222 to enclose the second magnet 34. Finally, the bottom plate 22 is disposed on the first upper surface 1420, and each sliding block 226 is slidably engaged into a corresponding rail 1424. The pointer 244 points to the first side surface 1422.

Figure 5:
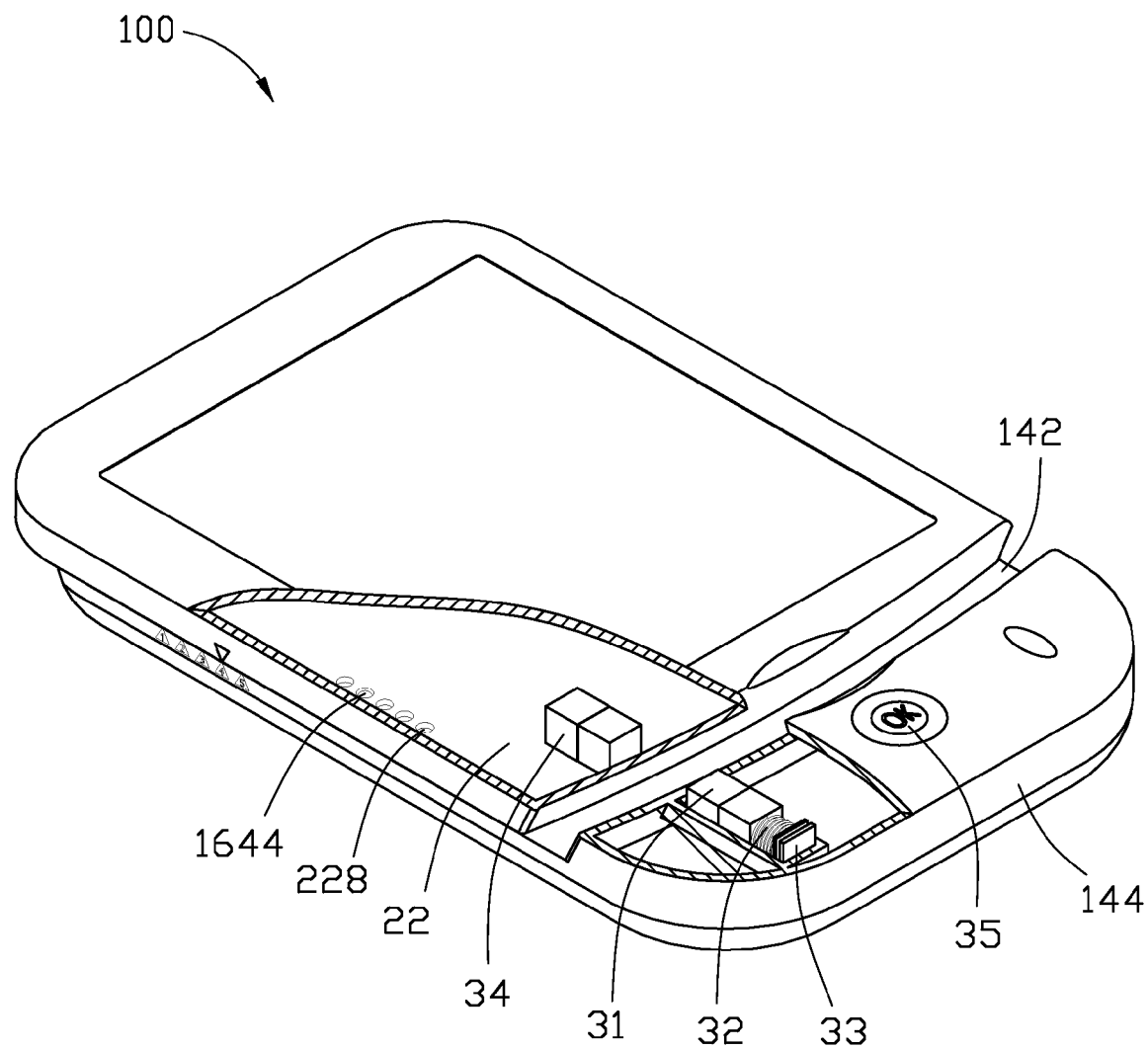
FIG. 5 is another partially sectioned, isometric, schematic view of the portable electronic device of FIG. 1.

Further referring to FIG. 5, in use, the sliding segment 20 is pushed by a user to slide on the base segment 10. The first and second magnets 31, 34 repel each other. The repulsion force applied on the first magnet 31 is transferred to the sensor 33 by the connecting spring 32. The sensor 33 senses the repulsion force and generates electric signals correspondingly. Typically, a voltage of the generated electric signal is proportional to the repulsion force, and decreases with the increase of distance between the first and second magnets 31, 34 accordingly. Voltage ranges corresponding to the five indicators 1423 are pre-stored in the portable electronic device 100. When the pointer 244 is pushed passed an indicator 1423, the positioning column 1644 protrudes from the through hole 1425 due to the compression of the positioning spring 1666, and is partially inserted into a corresponding positioning through hole 228. At the same time, the sensor 33 generates a corresponding electric signal. When the confirming button 35 is pressed by the user for confirming input information represented by the indicator 1423, the processing circuitry compares the voltage of the generated electric signal with the pre-stored voltage ranges to determine which indicator 1423 the pointer 244 is aligned with, and inputs the information represented by the determined indicator 1423. However, if the indicator 1423 is not desired, the sliding segment 20 is pushed again and the positioning column 1644 is forced to move back to the through hole 1425 accordingly. Therefore, the user can input numerals via pushing the sliding segment 20 and input characters from the keypad 144, and this is more convenient as compared with current portable electronic devices.

It should be mentioned that the sensor 33 is not limited to be a pressure sensor. Alternatively, the sensor 33 can be a tension sensor. Correspondingly, two opposite polarities of the first and second magnets 31, 34 are arranged to face each other such that the first and second magnets 31, 34 attract each other.

It is to be understood, however, that even though numerous characteristics and advantages of the present embodiments have been set forth in the foregoing description, together with details of the structures and functions of the embodiments, the disclosures are illustrative only, and changes may be made in details, especially in matters of arrangement of parts within the principles of the invention to the full extent indicated by the broad general meaning of the terms in which the appended claims are expressed.

What is claimed is:

1. A portable electronic device comprising:
a base segment defining more than one indicator;
a sliding segment slidably disposed on the base segment, the sliding segment defining a pointer operable to align with one of the more than one indicator; and
an input module comprising:
a first magnet received in the base segment;
a second magnet fixed in the sliding segment and aligned with the first magnet, the second magnet being configured for applying a magnetic force to the first magnet; and
a sensor connected to the first magnet, the sensor being configured to sense the magnetic force and convert the magnetic force into a corresponding electrical signal to indicate an input mode, the electrical signal being inputted to the electronic device; further wherein the base segment comprises a bottom shell and a main body, the main body comprising a cover plate disposed on the bottom shell and a keypad protruding from the cover plate, the keypad comprising a receiving frame defining a receiving slot in which the first magnet and the sensor are received; further wherein the sliding segment comprises a bottom plate and a sliding body, the bottom plate being slidably connected to the cover plate, the second magnet being fixed to the bottom plate, the sliding body being disposed on the bottom plate to enclose the second magnet; further wherein the cover plate defines a through hole therein, the bottom plate defining more than one positioning through hole each corresponding to an indicator, the base segment further comprising a positioning module, the positioning module comprising a positioning frame disposed on a bottom surface of the cover plate, a compressed positioning spring received in the positioning frame, and a positioning member, the positioning member comprising a base plate connected to the positioning spring and a positioning column extending upwards from the base plate and inserted through the through hole, the positioning column being operable to protrude from the through hole to insert into a positioning through hole corresponding to the indicator aligned with the pointer.

2. The portable electronic device as claimed in the claim 1, wherein the cover plate defines two rails, and the bottom plate comprises two sliding blocks slidably engaged in the two rails correspondingly.

3. The portable electronic device as claimed in the claim 1, wherein the cover plate comprises a first side surface on which the more than one indicator is defined, and the sliding body comprises a second side surface on which the pointer is defined.

4. The portable electronic device as claimed in the claim 1, wherein the input module further comprises a connecting spring, one end of the connecting spring being connected to the first magnet, and the other end being connected to the sensor, the connecting spring being operable to transfer the magnetic force from the first magnet to the sensor.

5. The portable electronic device as claimed in the claim 1, wherein the input module further comprises a confirming button which is operable to confirm the information to be inputted.

6. The portable electronic device as claimed in the claim 1, wherein the first magnet and the second magnet repel each other, and the sensor is a pressure sensor.

7. The portable electronic device as claimed in the claim 1, wherein the first magnet and the second magnet attract each other, and the sensor is a tension sensor.

* * * * *